United States Patent [19]

Bird et al.

[11] Patent Number: 5,230,659
[45] Date of Patent: Jul. 27, 1993

[54] CONSTANT VELOCITY RATIO UNIVERSAL JOINT HAVING IMPROVED CENTERING OF INNER AND OUTER JOINT MEMBERS

[75] Inventors: Colin A. Bird, Sutton Coldfield; Keith J. Pugh, Solihull, both of England

[73] Assignee: Hardy Spicer Limited, United Kingdom

[21] Appl. No.: 865,708

[22] Filed: Apr. 8, 1992

Related U.S. Application Data

[62] Division of Ser. No. 465,116, Apr. 9, 1990, abandoned.

[30] Foreign Application Priority Data

Aug. 20, 1987 [GB] United Kingdom ................. 8719657

[51] Int. Cl.[5] ............................................. F16D 3/223
[52] U.S. Cl. ....................................... 464/143; 464/906
[58] Field of Search ................. 464/143, 145, 906, 146

[56] References Cited

U.S. PATENT DOCUMENTS

| 1,975,758 | 10/1934 | Stuber . | |
|---|---|---|---|
| 2,579,356 | 12/1951 | Anderson . | |
| 3,785,172 | 1/1974 | Parsons | 464/146 |
| 4,019,347 | 4/1977 | Krude | 464/145 |
| 4,424,047 | 1/1984 | Welschof et al. | 464/145 |
| 4,459,122 | 7/1984 | Rehfeld | 464/906 X |

FOREIGN PATENT DOCUMENTS

| 16489 | 10/1980 | European Pat. Off. . |
| 2433349 | 7/1975 | Fed. Rep. of Germany . |
| 2522670 | 5/1976 | Fed. Rep. of Germany . |
| 2116672 | 9/1983 | United Kingdom . |

Primary Examiner—Daniel P. Stodola
Assistant Examiner—William G. Battista, Jr.
Attorney, Agent, or Firm—Marshall, O'Toole, Gerstein, Murray & Borun

[57] ABSTRACT

A constant velocity ratio universal joint, suitable for high speed low angle use, comprises outer and inner joint members (10,11) with engaging part-spherical surfaces (12,13) and arcuate ball-receiving grooves (14,15) diverging towards an end of the outer joint member closed by a closure member (17) with balls (16) held in the grooves by an element (31) and support member (32) which is pivoted on the closure member, and a spring (36) acting between the element (31) and support member (32) so that the balls are urged as far as possible into the grooves to take up clearances and maintain stability of the joint, particularly under no-torque conditions.

8 Claims, 5 Drawing Sheets

CONSTANT VELOCITY RATIO UNIVERSAL JOINT HAVING IMPROVED CENTERING OF INNER AND OUTER JOINT MEMBERS

This application is a continuation of application Ser. No. 07/465,116 filed Apr. 9, 1990, now abandoned.

This invention relates to a constant velocity ratio universal joint.

A joint according to the invention is intended for use under conditions where relatively low angles of articulation are required, and primarily, although not exclusively, at high rotational speeds. Such conditions occur at universal joints incorporated in a propeller shaft of a motor vehicle, i.e. the shaft extending longitudinally of the vehicle from a forwardly mounted engine unit to a rear driven axle of the vehicle. A vehicle propeller shaft may rotate at the same speed as, or possibly even faster than, the vehicle's engine, and thus rotational speeds of the order of 6,000 rpm or even higher can be expected to be encountered. At the same time, the geometry of the propeller shaft is usually such that the universal joints thereof do not have to accommodate articulation angles of more than 10° or so. However, universal joints according to the invention are not solely for use in propeller shafts, but may be used elsewhere where similar or analogous requirements arise, or even for lower speed applications where small articulation angles only are required.

One requirement for a constant velocity ratio universal joint intended to be used at a very high rotational speed in, e.g., a vehicle propeller shaft is that the joint should provide a high degree of radial stability, i.e. whichever one of the driving or driven members of the joint is not supported by external bearings should be constrained by the joint to rotate about a fixed axis. If the joint is envisaged in the aligned, non-articulated, condition, it should not permit the main driving and driven members of the joint to become offset radially from one another when in use. If the joint does not provide sufficient stability, the driving or driven member thereof which is not well supported by external bearings will not be constrained to rotate about a fixed axis, which will cause vibration unacceptable in a motor vehicle.

A universal joint has been proposed in British patent 2 116 672, comprising an outer hollow joint member with axially extending grooves in its inner wall, an inner joint member disposed within the outer joint member and provided with grooves in its outer wall corresponding to and facing the grooves of the outer joint member, the grooves in the joint members being curved as viewed in longitudinal cross-section of the joint and opposed pairs of grooves diverging to form jaw like openings wherein are received respective balls for torque transmission. The shape of the grooves is such that the centres of the balls occupy a plane bisecting the angle between the rotational axes of the joint members when the joint is articulated, to give it constant velocity ratio (homokinetic) properties, and the balls are retained in the grooves by a pivotable supporting element which extends into the openings of the grooves. Between their grooves, the inner and outer joint members have interengaging part-spherical surfaces.

As is described in the above mentioned patent, such a joint is assembled by holding separate parts of the outer joint member in a position relative to one another such that axial play in the joint is eliminated, and then welding such parts together. However, in practice such a method of assembly of the joint cannot eliminate all clearances therein, with the result that the joint may not offer sufficient stability for high speed operation. If all parts of the joint were perfect and conformed exactly to their design configuration, then all play could be eliminated but manufacturing tolerances and errors require there to be clearances so that the joint does not become jammed when it articulates, and this leads to the above described instability. Clearances in the assembled joint are necessitated by possible irregular spacing circumferentially of the joint of the ball-receiving grooves in the joint member, errors in the form of the grooves in that they may be not of constant cross-sectional shape all along their lengths, concentricity errors, and general surface irregularities. Surface irregularities are inevitably present, particularly when production of the ball-receiving grooves in the joint members is carried out by a forming operation rather than by machining.

The clearances in the joint are a particular problem when the joint is transmitting little or no torque. Under torque transmission, the forces acting on the balls of the joint cause the balls to occupy positions relative to the cross section of the grooves such that clearances are taken up, but when no torque is being transmitted these conditions do not apply.

It is the particular object of the present invention to provide a constant velocity ratio universal joint which overcomes or reduces this problem of joint instability. At the same time, of course, the joint should be economical to manufacture.

According to one aspect of the present invention, we provide a constant velocity universal joint comprising:
an outer joint member of hollow form;
an inner joint member disposed at least partially within the outer joint member,
said outer and inner joint members having interfitting part-spherical surfaces to permit relative articulation therebetween;
said outer joint member having a plurality of circumferentially spaced axially extending grooves in its interior, and said inner joint member having complementary grooves on its exterior, facing the grooves in the outer joint member in pairs,
said grooves being of arcuate form as viewed in planes containing the rotational axis of the respective joint member, and having centres of curvature spaced so that the grooves of each pair diverge from one another towards one end of the joint;
a closure member closing the outer joint member at said one end thereof;
a plurality of balls disposed one in each facing pair of grooves in the joint members for torque transmission therebetween;
a ball-engaging element of annular form supported relative to the closure member of the joint for universal pivotal movement and engaging the balls to hold them in the grooves;
and spring means supporting the ball engaging element to urge the balls into the pairs of grooves.

In a joint according to the invention, the support of the ball engaging element by spring means has the result that the balls are always urged as far as possible into their respective diverging pairs of grooves, so that the inner and outer joint members remain centered relative to one another. The effect of the spring means is particularly valuable when the joint is rotating but transmitting little or no torque. Under such conditions the necessary clearances in a previously known joint, as above referred to, would mean that the balls are not held as far as possible in the converging grooves and thus the inner and outer joint parts are not held centered relative to one another.

According to another aspect of the invention we provide a constant velocity ratio universal joint comprising: an outer joint member of hollow form;
   an inner joint member disposed at least partially within the outer joint member,
   said outer and inner joint members having interfitting part-spherical surfaces to permit relative articulation therebetween;
   said outer joint member having a plurality of circumferentially spaced axially extending grooves in its interior, and said inner joint member having complementary grooves on its exterior, facing the grooves in the outer joint member in pairs,
   said grooves being of arcuate form as viewed in planes containing the rotational axis of the respective joint member, and having centres of curvature spaced so that the grooves of each pair diverge from one another towards one end of the joint;
   the transverse cross-sectional shape of each of the grooves comprising side portions engaged by the respective ball when the joint is transmitting torque, and a base portion;
   a closure member closing the outer joint member at said one end thereof;
   a plurality of balls disposed one in each facing pair of grooves in the joint members for torque transmission therebetween;
   a ball-engaging element of annular form supported relative to the closure member of the joint for universal pivotal movement and engaging the balls to hold them in the grooves;
   and spring means supporting the ball engaging element to urge the balls into the pairs of grooves, such that the balls engage the base portions of the grooves when the joint is not transmitting torque.

Preferably the spring means provides for a limited movement of the ball engaging element and balls towards said end of the joint against the spring means, whereafter an increased resistance to said movement is provided.

When a joint according to the invention (or indeed any universal joint having diverging ball-receiving grooves) is transmitting torque, forces acting on the balls attempt to expel the balls from their grooves at the widely spaced ends thereof. In a joint according to the invention, such forces overcome the force exerted by the spring means but after the balls have moved towards the closure member of the joint outer member by the limited amount permitted by the spring means, further ball movement is resisted. When the joint is transmitting torque, the balls assume positions in the grooves relative to the cross-section thereof such that the inner and outer joint members remain effectively centered relative to one another.

When each ball-receiving groove of a joint according to the invention has a transverse cross-sectional shape, i.e. a shape viewed along the length of the groove, comprising side portions, one or the other of which the ball engages when the joint is transmitting torque according to the direction of torque transmission, and a base portion, the spring means urges the balls as far as possible into the opposed grooves until they bottom therein engaging the base portions of the grooves, when the joint is not transmitting torque. The cross-sectional shape of each groove may be that of a truncated ellipse or truncated gothic arch, elliptical or gothic arch shaped grooves being well known in universal joints wherein the balls have so-called angular contact with the grooves.

Preferably the joint further comprises a support member having a peripheral portion supporting the ball engaging element, and a central portion supported for said universal pivotal movement on the closure member. Conveniently, such support member may be a metal pressing.

The central portion of the support member may have a part-spherical formation which engages a complementary part-spherical formation on the closure member of the joint, to provide for the universal pivotal movement. To reduce friction, one or both of the surfaces of such interengaging part-spherical formations may be provided with a suitable friction-reducing coating.

Preferably the spring means is disposed between the ball engaging element and the peripheral portion of the support member. Such spring means may comprise radially extending spring fingers, formed preferably in the peripheral portion of the support member itself. However, it will be appreciated that a separate spring could be provided. It would also be within the scope of the invention if spring means were to be provided operative between the support member and the closure member rather than between the support member and the ball engaging element. For example, the support member could pivot on a member which is separate from the closure member and spring-supported relative thereto.

Preferably the peripheral portion of the support member also forms stop means which is engagable by the ball engaging element after the limited movement of the latter towards the closure member of the joint has taken place against the force exerted by the spring means.

Assembly of a joint according to the invention requires setting of the closure member and the ball engaging element relative to the outer joint member such that when the joint is not transmitting torque the spring means holds the balls fully in the grooves, and yet they assume a correct position when the joint is transmitting torque. The method of such setting is described in detail hereafter.

As above described, the support of the balls by the ball engaging member and the spring means has the effect that the necessary stability of the joint is maintained even though the aforementioned errors and deviations from the desired configuration of the joint members may exist. Particularly, it enables the ball-receiving grooves in the joint members to be provided by forming operations on the joint members without requiring subsequent machining of the grooves.

In a joint according to the invention, the outer joint member will normally be manufactured by carrying out machining and/or grinding operations (hereafter all referred to as machining) on a component which has been formed or forged to a partly finished shape. As above referred to, the ball-receiving grooves may be formed to their desired shape with sufficient accuracy without requiring subsequent machining. Apart from the configuration of the grooves, the disposition and form of the part spherical surface of the outer joint member between the grooves thereof is also of importance, and the invention provides that in manufacture of the outer joint member a component having formed ball-receiving grooves therein may be measured by inserting axially into it a member having formations corresponding in shape to a theoretical desired position of the balls in the joint, and using the position of such member when its formations bottom in the grooves as a datum for determining the disposition of the part-spherical surface of the outer joint member between the grooves thereof.

The formation of the part-spherical surface will normally be carried out by machining the outer joint member, working from the datum established as aforesaid.

The above procedure ensures that the relationship between the grooves and the part-spherical surface of the joint member is such that in the assembled joint the parts thereof fit together to the desired limits.

The invention will now be described by way of example with reference to the accompanying drawings, of which.

Figure 1:
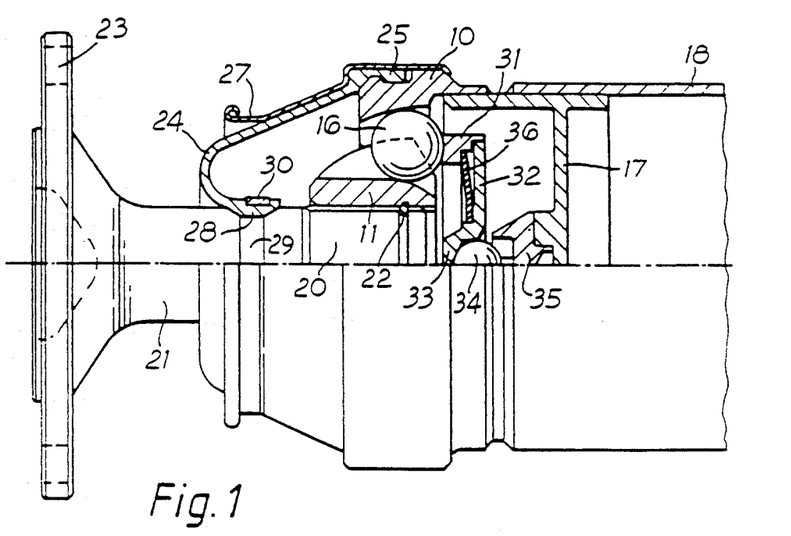
FIG. 1 is a part section through one embodiment of joint according to the invention.
Figure 2:
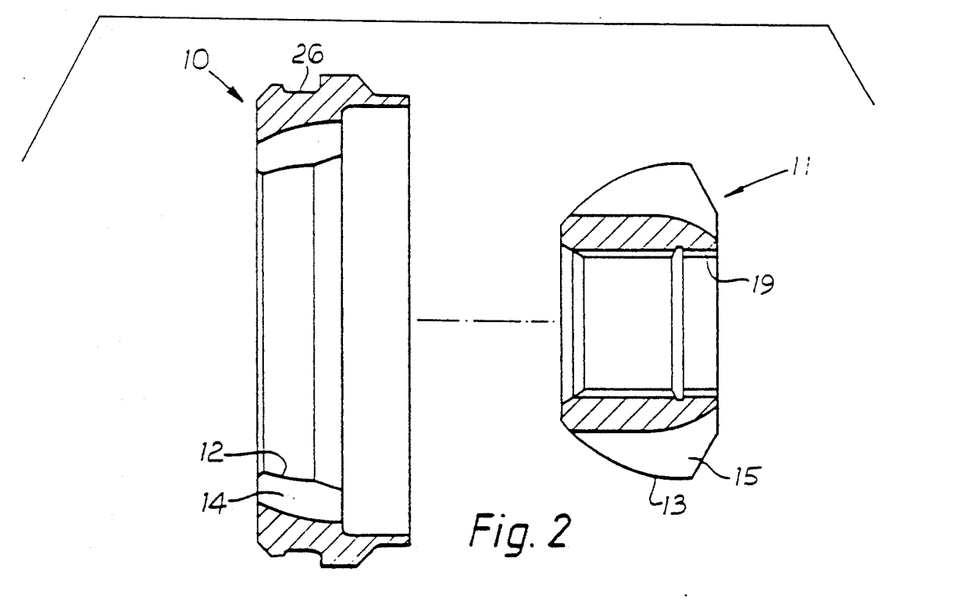
FIG. 2 shows in greater detail the inner and outer joint members of the joint of FIG. 1.

Referring firstly to FIGS. 1 and 2 of the drawings, the universal joint there illustrated comprises an outer joint member 10 and an inner joint member 11 disposed within the outer joint member. The outer joint member, as seen most clearly in FIG. 2, has an internal part-spherical surface 12 and the inner joint member has a complementary part-spherical surface 13 which engages the surface 12 of the outer joint member. The joint members are thus able to articulate relative to one another The outer joint member has a plurality of circumferentially spaced generally axially extending grooves 14 provided in its interior, and the inner joint member has complementary circumferentially spaced grooves 15 which face the grooves in the outer joint member in opposed pairs. As viewed in the section of FIG. 1, which is in a plane containing the common rotational axis of the two joint members when they are aligned with one another (i.e. not articulated) the grooves 14 are of arcuate configuration and the grooves 15, in the parts where they are contacted by the balls in use, are of arcuate configuration. A plurality of balls 16 are disposed one in each facing pair of grooves 14, 15, for torque transmission between the joint members. As viewed in the aforesaid plane, the grooves 14 and the arcuate grooves 15 have their centres of curvature offset from one another in known manner so that the grooves diverge from one another towards the right hand end of the joint (with reference to the drawing) and when the joint is articulated the balls occupy positions in the grooves such that the plane containing the centres of the balls bisects the angle between the rotational axes of the inner and outer joint members. This gives the joint constant velocity ratio (homokinetic) running characteristics.

The outer joint member 10 has its right hand end closed by a closure member 17 which is secured to the outer joint member by welding, e.g. laser or electron beam welding. The closure member 17 provides for connection, also by welding, to a tubular shaft element 18. The inner joint member 11 has a splined bore 19 which receives a splined end portion 20 of a stub shaft 21. A spring ring 22 holds the portion 20 of the stub shaft in the inner joint member 11. The opposite end of the stub shaft 21 is provided with an apertured flange 23 for bolting to any applicable rotary drive element.

For sealing the universal joint to retain lubricant therein and exclude dirt, an annular flexible elastomeric sealing boot 24 is provided. This has one end portion 25 received on the outer joint member 10, engaging an annular groove 26 on the exterior of the latter and held thereon by a protective metal can 27. The other end portion 28 of the boot is held in engagement with an annular groove 29 by a retaining ring 30.

The balls 16 are contacted by an annular ball engaging element 31. A circular support member 32 has its periphery engagable with the element 31, and its centre formed with a concave formation 33 pivotable on a ball 34. The ball is received in a cup 35 held by the closure member 17. A spring 36 is operative between the ball engaging element 31 and the support member 32, to bias the former relative to the latter in the direction towards the balls 16.

The nature of the cooperation between the ball engaging element 31, spring 36, and support member 32 will be most clearly seen with reference to FIG. 3 of the drawings. It will be noted that the element 31 is provided with an abutment surface 37, which engages the support member 32 after a limited movement of the element 31 relative to the member 32 in the direction towards the closure member 17 of the joint. The spring 36 may comprise a plurality of spring fingers extending radially from a central annular portion engaging the member 32.

During assembly of the joint, the correct positional relationship must be established between the outer joint member 10 and the closure member 17 so that the ball engaging element 31, support member 32, and spring 36 cooperate correctly. In particular, the spring should be effective, by way of the ball engaging element 31, to hold the balls to the greatest possible depth in their grooves when the joint is not transmitting torque. At the same time, the balls should be able to move axially of the joint when torque is being transmitted, against the force exerted by the spring means, until the limit of such resiliently opposed movement is reached whereafter there is a greater resistance to such ball movement.

Figure 3A:
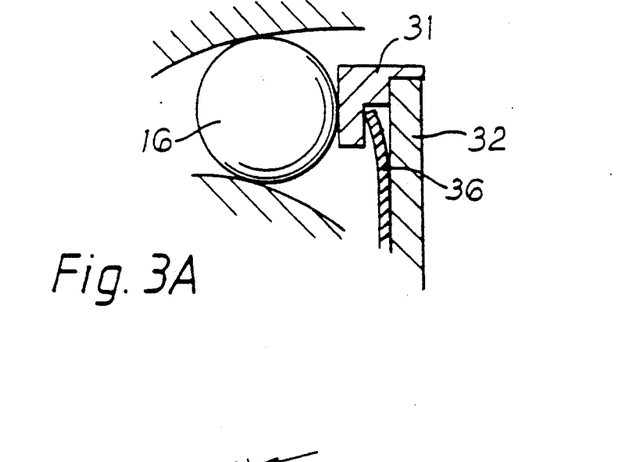
FIGS. 3A to 3E show, diagrammatically, part of the joint to illustrate how it is assembled and the relationships of the parts of the joint in use.
Figure 3B:
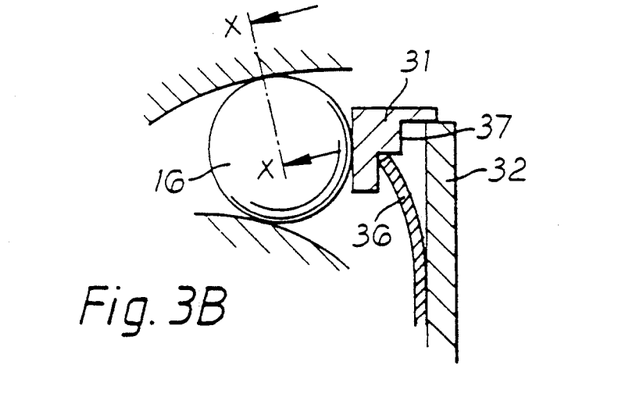
Figure 3C:
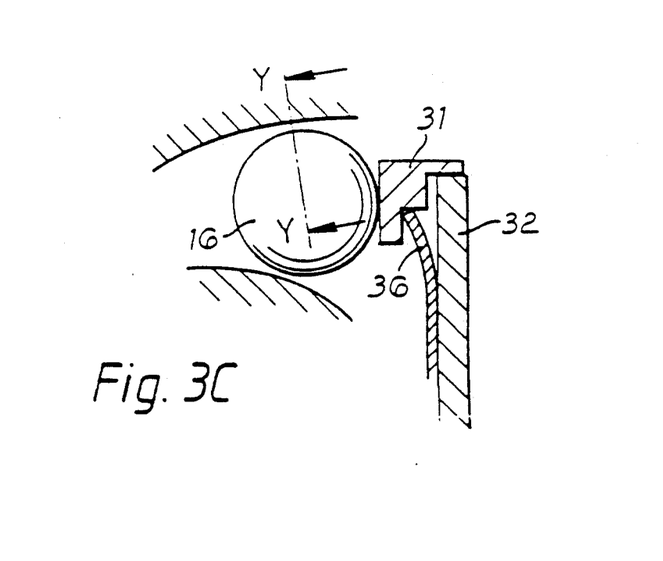

To achieve these conditions, the joint is assembled and the cover member 17 moved to the left, with reference to the drawings, relative to the outer joint member, until the position shown in FIG. 3A is attained. That is to say, with the balls 16 pushed as far as possible into the converging grooves, the abutment surface 37 of the ball engaging element 31 engages the support member 32 so that the assembly becomes solid. The cover member 17 is then moved back a predetermined distance and welded to the outer joint member. Then, when the joint is not transmitting torque the relationship as shown in FIG. 3B is assumed, i.e. the balls are pushed as far as possible into the converging grooves in the joint members under the action of spring 36 to bottom in the grooves. When torque is being transmitted by the joint, the situation of FIG. 3C exists. Owing to the forces acting on the balls as a result of the configuration of the converging grooves, the balls are displaced towards the diverged end of the grooves and this moves the ball engaging element 31 back against the action of spring 36. The amount by which the balls move towards the diverged end of the grooves is determined by the force exerted on them according to the torque being transmitted. Ultimately, however, the element 31 will contact the member 32 and no further such movement of the balls is possible.

Figure 3D:
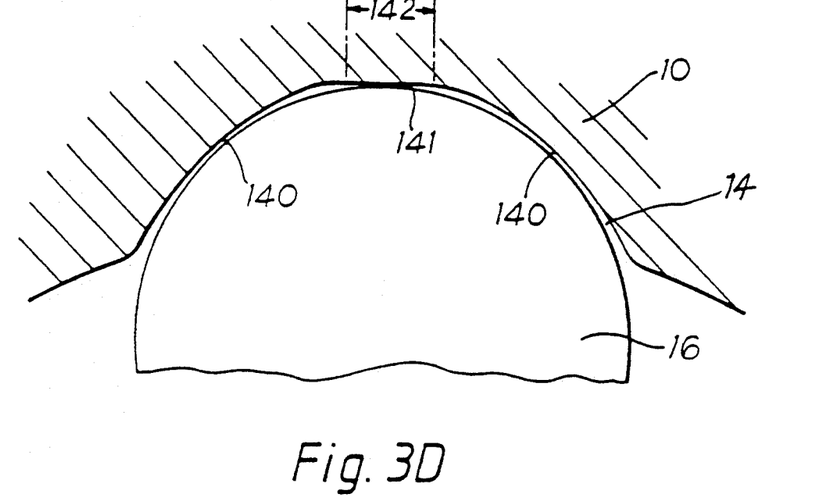
Figure 3E:
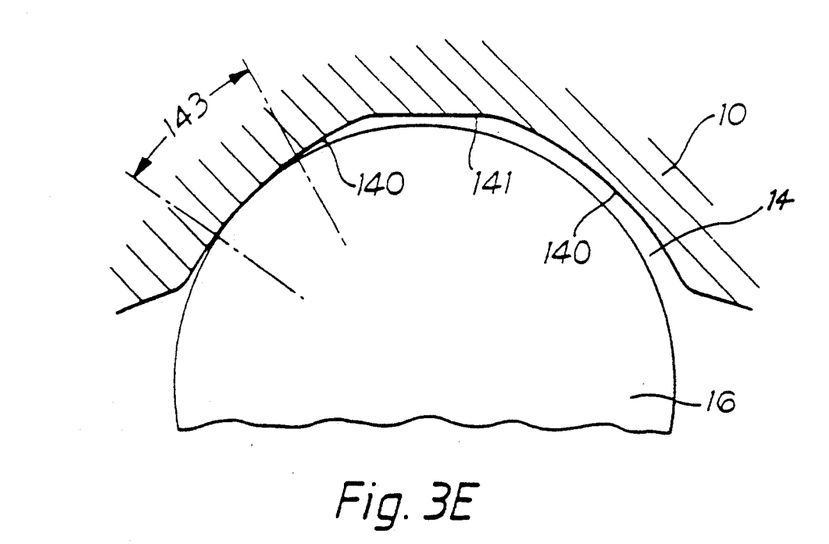

FIGS. 3D and 3E show in transverse cross-section one of the grooves 14 in the joint outer member 10. The cross-sectional shape of the groove is that of a truncated gothic arch, comprising curved side portions 140 and a flat base portion 141. FIG. 3D illustrates the position of the ball 16 when the joint is not transmitting torque, as shown in FIG. 3B. The ball bottoms in the groove, contacting the base portion 141 thereof. FIG. 3E illustrates the position of the ball in the groove when torque is being transmitted, corresponding to FIG. 3C. The ball has moved away from the base 141 of the groove, and engages one of the side portions 140 thereof, theoretically at a point but in practice over a curved contact pressure region 143. Such a mode of engagement of the balls with side portions of the ball receiving grooves in joint members is well known in so-called angular contact universal joints.

Further, of course, the spring biased relationship between the ball engaging element and the support member is such that any minor irregularities in the joint dimensions and geometry, which arise from production tolerances, are absorbed, and there is sufficient flexibility to ensure that the balls are always held in the grooves without backlash in the joint as a whole.

When the joint rotates in the articulated condition, the ball engaging element 31 and the support member 32 pivot about the ball 34 with the action of a swash plate. Because the centre about which it pivots is not coincident with the bending centre of the joint, relative radial movement must occur between the balls 16 and ball engaging element 31 where they make contact.

Figure 4:
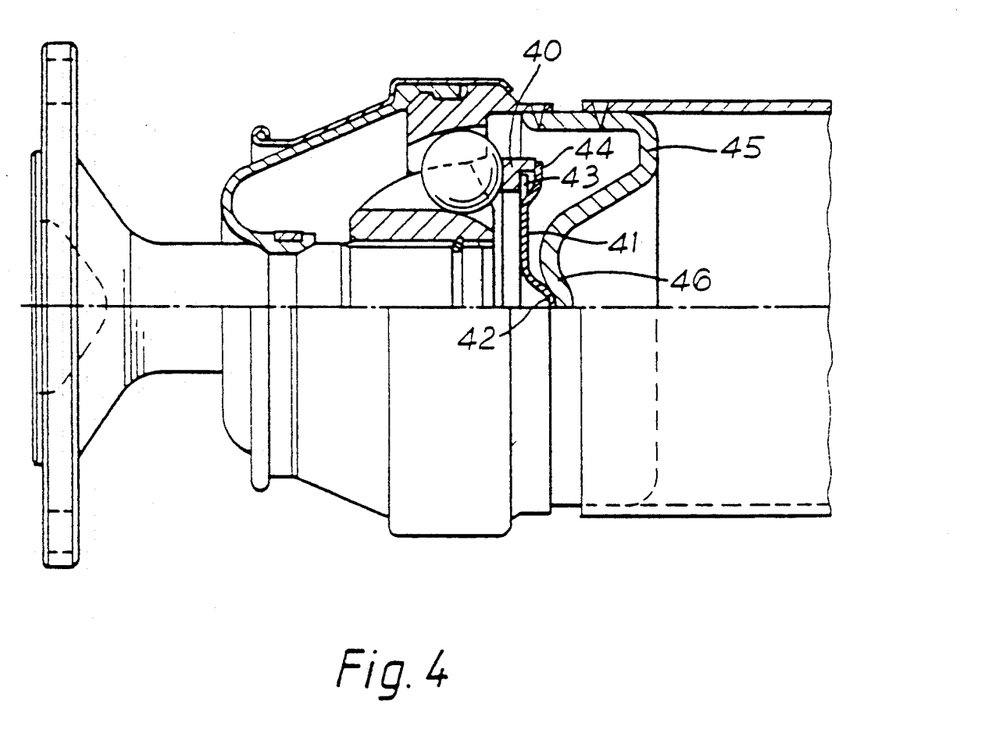
FIG. 4 is a part section through a further embodiment of joint according to the invention.

Referring now to FIG. 4 of the drawings, this shows, in a view corresponding to FIG. 1, a further embodiment of joint according to the invention. The joint has main components which are identical to those of FIG. 1 and which will not therefore be described in detail, namely an outer joint member, inner joint member with stub shaft, torque transmitting balls, and sealing boot assembly. The joint differs from the joint of FIG. 1 in respect of the configuration of the closure member for the outer joint member, and the ball engaging element and support member therefor.

The ball engaging element 40 of the joint of FIG. 4 is a rigid annular member but of slightly different configuration from the ball engaging element 31. The support member therefor is a metal pressing 41 whose centre 42 is formed as a domed protrusion with a part-spherical surface. The periphery of the member 41 is formed into radially extending spring fingers 43 which engage the element 40, alternating with stop fingers 44 which are relatively more rigid than the spring fingers 43. Selection of suitable material for the support member 41 and its formation with integral spring fingers and the stop fingers 43, 44 eliminates the need for the separate spring which is present in the embodiment of FIG. 1. The closure member 45 is also a metal pressing, whose centre 46 is formed as a part-spherical cup and whose periphery is a generally cylindrical wall for welding to the outer joint member and tubular shaft member.

The joint of FIG. 4 would be assembled in the same way as above described in relation to the joint of FIG. 1. The spring fingers 43 provided at the periphery of the support member 41 spring bias the ball engaging element 40 to hold the balls to the maximum possible depth in their respective grooves when the joint is not transmitting torque, but when the joint is transmitting torque the ball engaging element 40 can move back against the resistance offered by the spring fingers 43 until the stop fingers 44 are abutted to provide an increased resistance to further such movement.

Because of the spring biased manner in which the balls are held in the grooves of the joint members, which is able to absorb minor irregularities in joint dimensions and geometry, the inner and outer joint members of the joint according to the invention are particularly suited to be manufactured to a large extent by metal forming or forging techniques rather than by removal of metal by machining. With reference back to FIG. 2 of the drawings, in a preferred embodiment of the joint the grooves 14, 15 may be shaped by forming. Only the part-spherical surfaces 12, 13 of the joint members need be machined to their finished shape.

It will be appreciated that when a joint member is made by a forming or forging technique, the dimensions of certain parts thereof will vary according to factors such as wear of the tooling being used in the process.

Figure 5A:
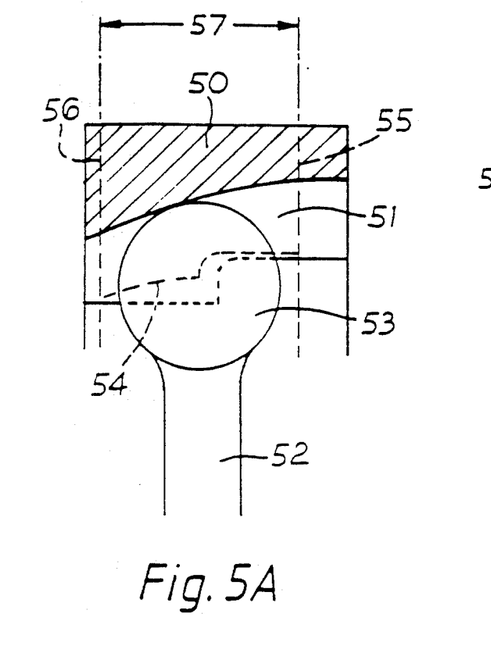
FIGS. 5A and 5B show diagrammatically how an outer joint member of a joint according to the invention would be manufactured.
Figure 5B:
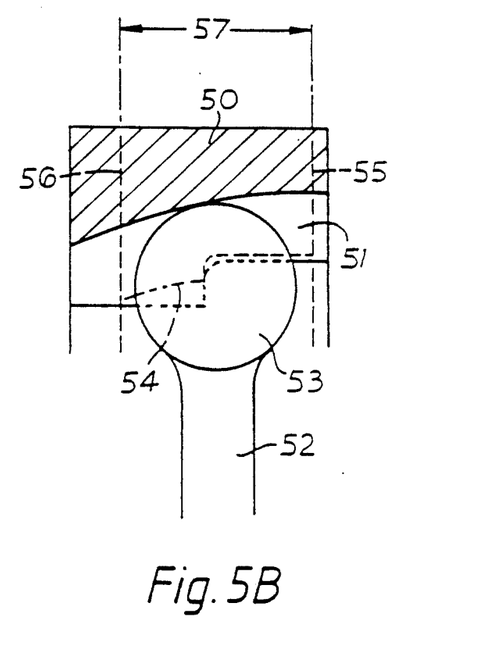

In a method of manufacturing the outer member of a joint according to the invention, a partly formed member in which the ball-receiving grooves therein have been provided by a forming process, is gauged by inserting axially into it a member which is provided with circumferentially spaced formations with surface portions which correspond in shape to the balls of the joint located on the desired pitch circle diameter. The distance by which such a member will enter the component is determined by whether the ball-receiving grooves formed therein are at the large or small end of the tolerance range. The position of the inserted member when its formations bottom in the grooves in the outer joint member is used as a datum for further manufacture by machining of the part-spherical surface of the outer joint member between the grooves thereof. This is illustrated with reference to FIG. 5.

FIGS. 5A and 5B show a partly finished outer joint members 50 with formed ball-receiving grooves 51 therein. When a gauging member 52 with a plurality of circumferentially spaced ball formations 53 is inserted axially from the right hand end of the member, it will move into the member until the ball formations 53 bottom in the grooves 51, by a distance according to whether the dimensions of the grooves 51 are at the large end of the tolerance range as shown in FIG. 5A or, as shown in FIG. 5B, at the small end of such range. The position thus reached of the member 52 is then used as the datum for removing excess material from the ends of the component 50, as indicated by broken lines 55, 56, and for the machining of the part-spherical internal surface of the member, indicated at 54. The axial dimension of the finished member is indicated at 57. Such manufacture of the joint outer member enables the joint to be assembled in the manner above described, and the joint to have the necessary radial stability. The manner in which the balls are held resiliently in the grooves means that the variation in inclination of the ball-receiving grooves relative to the axis of rotation of the joint member when the balls bottom therein does not affect the operation of the joint.

The same principle, using an appropriately configured gauging member, may also be used in manufacture of the joint inner member. In general, however, an inner joint member is not subject to the same problems of distortion in manufacture as an outer member, so the method described need not be used.

Figure 6:
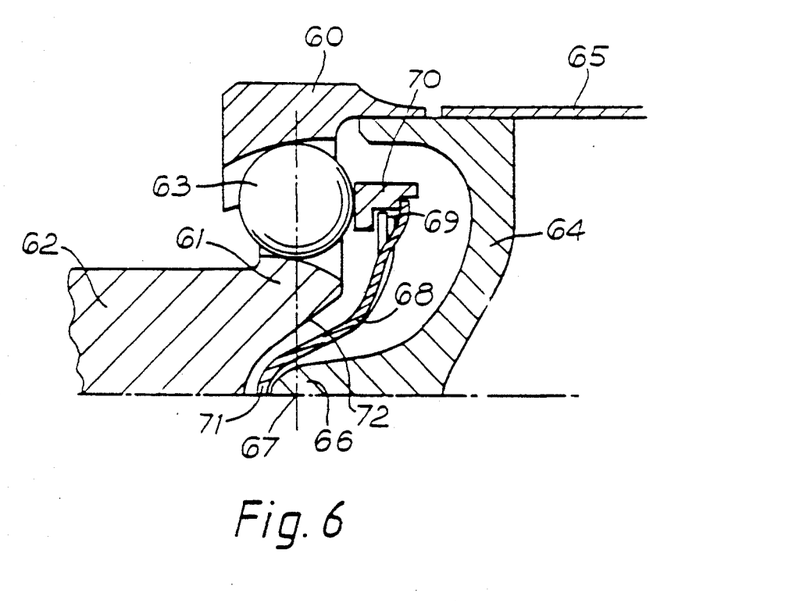
FIG. 6 is a part section through yet another embodiment of joint according to the invention.

Referring now to FIG. 6 of the drawings, this shows a joint which comprises an outer joint member 60 which is of substantially the same configuration as the outer joint members above described. The joint further comprises an inner member 61 which is integral with a shaft portion 62. The outer and inner joint members 60, 61 have arcuate grooves for receiving torque transmitting balls as 63, and interengaging part-spherical surfaces between the grooves as above described in relation to the joints of FIGS. 1 and 4.

A closure member 64 is secured by welding to the outer joint member, and provides for attachment to a tubular shaft element 65. The centre of the closure member 64 comprises a protruding formation 66 which has at its end a part-spherical surface whose centre of curvature lies at the bending centre of the universal joint, i.e. the centre of curvature of the interfitting part-spherical surfaces of the outer and inner joint members as indicated at 67. This part-spherical surface on the closure member 64 provides a pivotal support for the support member 68 of the joint, which is a circular sheet metal component whose periphery at 69 is formed with spring fingers and stop fingers co-operating with a ball engaging element 70 in the manner of corresponding parts of the joints previously described. The centre 71 of the support member 68 is formed as a cup to pivot on the part-spherical surface at the end of portion 66 of the closure member 64. To accommodate the portions 66 of the closure member and 71 of the support member, the joint inner member 61 is provided with a relatively deep axially extending recess 72.

In the joint of FIG. 6, when the joint articulates the support member 68 pivots about the bending centre of the joint. Therefore the above described relative radial movement occurring between the balls and the ball-engaging element of the joint does not occur. This can present the advantage of reduced internal friction in the joint, and hence less heat generation in use.

We claim:

1. A constant velocity ratio universal joint comprising:
   an outer joint member (10,60) of hollow form;
   an inner joint member (11,61) disposed at least partially within the outer joint member;
   said outer and inner joint members having part-spherical surfaces (12,13) which engage one another to permit relative articulation between the joint members;
   said outer joint member having a plurality of circumferentially spaced axially extending grooves (14) in its interior, and said inner joint member having complementary grooves (15) on its exterior facing the grooves in the outer joint member in pairs;
   said grooves (14,15) being of arcuate form as viewed in planes containing the rotational axis of the respective joint member, and having centres of curvature spaced so that the grooves of each pair diverge from one another towards one end of the joint;
   a closure member (17,45,64) closing the outer joint member at said one end thereof;
   a plurality of balls (16,63) disposed one in each facing pair of grooves in the joint members for torque transmission therebetween;
   a ball-engaging element (31,40,70) of annular form supported relative to the closure member of the joint for universal pivotal movement and engaging the balls to hold them in the grooves;
   a support member (32,41,68) having a peripheral portion supporting the ball engaging element and a central portion (33,42,71) supported for said universal pivotal movement on the closure member (17,45,64); and
   spring means (36,43,69) supporting the ball engaging element to urge the balls into the pairs of grooves, the spring means (36,43,69) being disposed between the ball engaging element and the peripheral portion of the support member.

2. A joint according to claim 1 wherein said central portion (33,42,71) of the support member and the closure member having interengaging part-spherical formations (34,46,66).

3. A joint according to claim 1 wherein said spring means comprises radially extending spring fingers (43,69) formed in the peripheral portion of the support member.

4. A joint according to claim 3 wherein said central portion (33,42,71) of the support member and the closure member have interengaging part-spherical formations (34,46,66).

5. A joint according to claim 1 wherein the peripheral portion of the support member also forms stop means engagable by the ball engaging element after movement thereof against the spring means.

6. A joint according to claim 5 wherein said central portion (33,42,71) of the support member and the closure member have interengaging part-spherical formations (34,46,66).

7. A constant velocity ratio universal joint comprising:
   an outer joint member (10, 60) of hollow form;
   an inner joint member (11, 61) disposed at least partially within the outer joint member;
   said outer and inner joint members having part-spherical surfaces (12, 13) which engage one another directly yet permit relative articulation between the joint members;
   said outer joint member having a plurality of circumferentially spaced axially extending grooves (14) in its interior, and said inner joint member having complementary grooves (15) on its exterior, facing the grooves in the outer joint member in pairs;
   said grooves (14, 15) being of arcuate form as viewed in planes containing the rotational axis of the respective joint member, and having centres of curvature spaced so that the grooves of each pair diverge from one another towards one end of the joint;
   a plurality of balls (16, 63) disposed a respective one in each facing pair of grooves in the joint members for torque transmission therebetween;
   the transverse cross-sectional shape of each of the grooves comprising side portions (140) engaged by the respective ball when the joint is transmitting torque, and further comprising a base portion (141) between said side portions;

a closure member (17, 45, 64) closing the outer joint member at said one end thereof;

a ball-engaging element (31, 40, 70) of annular form supported relative to the closure member of the joint for universal pivotal movement and engaging the balls to hold them in the grooves;

a support member (32, 41, 68) having a peripheral portion supporting the ball engaging element and a central portion (33, 42, 71) supported for said universal pivotal movement on the closure member (17, 45, 64); and spring means (36, 43, 69) supporting the ball engaging element to urge the balls into the pairs of grooves, such that the balls engage the base portions (141) of the grooves when the joint is not transmitting torque thereby holding the inner and outer joint members centered relative to each other and providing stability to the joint, and reducing backlash in the joint.

8. A joint according to claim 7 wherein said central portion (33; 42; 71) of the support member and the closure member have interengaging part-spherical formations (34; 46; 66).

* * * * *